Oct. 12, 1937.　　　E. H. ALDEBORGH ET AL　　　2,095,405
BORE MEASURING ATTACHMENT FOR DIAL INDICATORS
Filed April 12, 1937　　　2 Sheets-Sheet 1
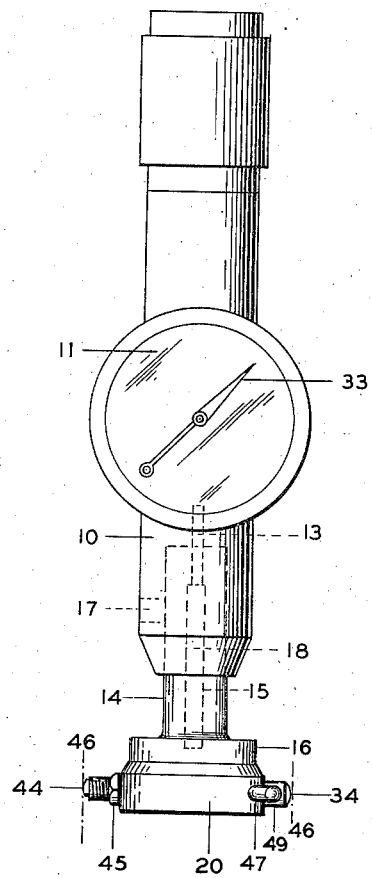
FIG. 1
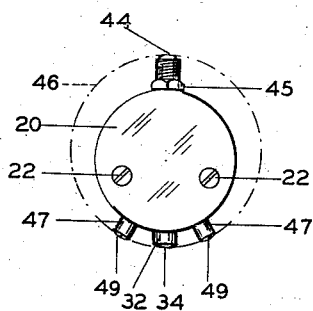
FIG. 3
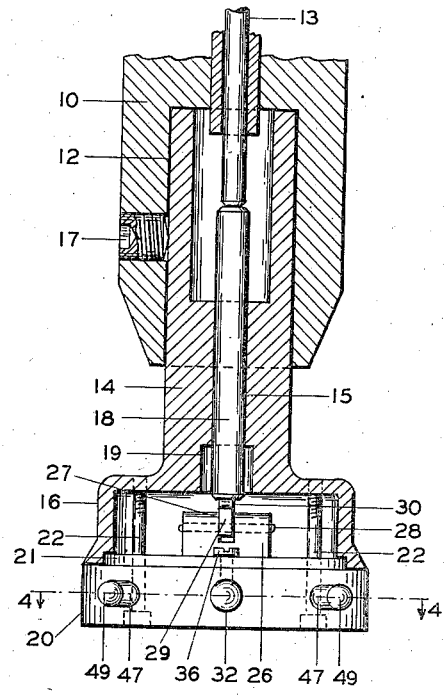
FIG. 2
FIG. 4
Inventors
ERIK H. ALDEBORGH
CHRISTIAN E. RUF
By John J. Thompson
Attorney Oct. 12, 1937.   E. H. ALDEBORGH ET AL   2,095,405
BORE MEASURING ATTACHMENT FOR DIAL INDICATORS
Filed April 12, 1937   2 Sheets-Sheet 2
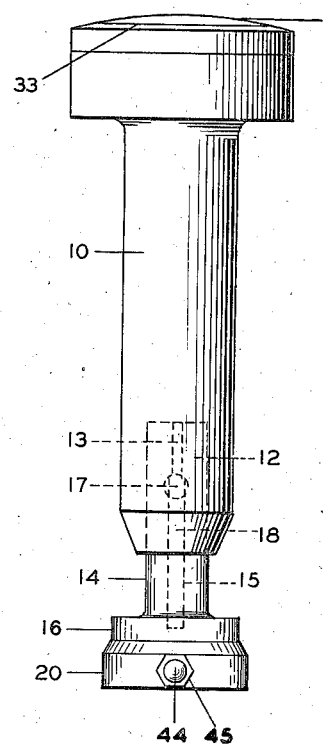
Inventors
ERIK H. ALDEBORGH
CHRISTIAN E. RUF Patented Oct. 12, 1937

2,095,405

UNITED STATES PATENT OFFICE 2,095,405

BORE MEASURING ATTACHMENT FOR DIAL INDICATORS

Erik H. Aldeborgh and Christian E. Ruf, Poughkeepsie, N. Y., assignors to Standard Gage Company, Incorporated, Poughkeepsie, N. Y., a corporation of New York Application April 12, 1937, Serial No. 136,397

7 Claims. (Cl. 33—178)

This invention relates to an attachment for dial indicators whereby the diameter of internal bores may be checked for size, taper, out-of-roundness, and other conditions, giving a direct reading upon a dial indicator having any desired scale of graduations.

In the usual type of internal or bore indicators, the full length of the bore may be measured provided the bore is open at both ends allowing the end of the instrument to project beyond the end of the bore but where one end of the bore has a shoulder, or is closed, it is impossible to accurately measure the bore over its entire length.

Also, instruments of this kind generally have the indicator mechanism and the contact or actuating mechanism incorporated in one casing or instrument, requiring a separate complete instrument for each range of sizes or for each different graduation of dial, necessitating several instruments for a comparatively small range of sizes.

Bore measuring instruments have been made employing two parallel locating pins or spring mounted studs for locating the instrument within the bore of the work and to centralize it before the measurement is taken, but these studs being mounted in parallel relation and at right angles to the diametrical center line of the instrument head and being rigidly secured together will contact the bore of the work at an angle which is not a right angle, whereby tending to force the ends of the studs towards each other, causing them to bind in their bearings, which may affect the accuracy of the instrument, and this condition increases as the diameter of the bore to be measured decreases.

To overcome these and many other disadvantages in the usual type of bore indicator, we have conceived a device in the form of an attachment which may be readily attached to a standard dial indicator frame having the dial indicator mounted either on the side or upon the upper end thereof, and whereby the bottom of the bore having a closed or shouldered end may be accurately measured, and the reading of the dial in plain sight of the operator.

The object of the invention is to provide a unit attachment containing the locating and contact measuring mechanism which may be attached to a dial indicator frame for operating the plunger of the dial indicator.

Another object of the invention is to provide a device of this kind that may be attached to indicator frames having dials of different graduations.

Another object of the invention is to provide a device of this kind that may be made in several different sizes, any one of which may be interchanged in the same indicator frame.

Another object of the invention is to provide a device of this kind whereby bores having a shoulder or being closed upon one end may be measured accurately over its entire length.

Another object of the invention is to provide an instrument in which the locating studs are mounted in a radial manner in the head and are capable of independent movement and will contact the wall of the bore to be measured at an approximate right angle without regard to the diameter of the bore so that they have no side strain and will not bind in their bearings.

Another object of the invention is to provide an instrument of this kind in which all of the mechanism is self-contained within a single unit or head that may be readily interchanged with other heads of different capacity or with other casings or mounting means of indicators.

With these and other objects in view, our invention consists in certain novel construction and combination of parts as will hereinafter be fully described and claimed and further illustrated in the accompanying drawings which form a part hereof, and in which like figures of reference refer to corresponding parts in all of the views, and it is understood that slight changes may be made without departing from the spirit of the invention.

In the drawings:

Figure 1 is a side elevation of the device, showing the same attached to the frame of a standard dial indicator having the dial located upon the side.

Figure 2 is an enlarged vertical front view of the device partly in section and showing the dial mechanism operating plungers.

Figure 3 shows an end view of the instrument within a bore to be measured.

Figure 4 is an enlarged partial detail sectional view of the head taken on the line 4—4 of Figure 2, showing the locating studs in a receded position, in contact with the wall of the bore of the work.

Figure 5 shows the instrument attached to the frame of a dial indicator having the dial mounted at right angles upon the upper end thereof.

Figure 6 is an enlarged partial sectional view of the casing and head unit.

Figure 7 is an enlarged plan view of the inner side of the head unit.

Figure 8 is an enlarged partial sectional view of the head taken on the line 8—8 of Figure 7, showing the adjustable locating pin, contact plunger, anvil plug, and plunger bell-crank.

Figure 9 is an enlarged partial sectional view of one of the locating studs in the head, taken on the line 9—9 of Figure 7.

Referring to the drawings:

While our invention is capable of being attached to, or incorporated in the original design of frame of any suitable indicator, we have here shown it as attached to a standard form of dial indicator frame 10, which may have the dial indicator 11 mounted either upon the side as shown in Figure 1, or upon the end as shown in Figure 5, the frame 10 being formed with an axial bore 12 and a sliding plunger 13 for operating the dial mechanism in the usual way.

Our device comprises a member consisting of a tubular shank 14 of any desired length and formed with an axial bore 15 communicating with an integral circular cup-shaped housing 16, and detachably mounted in the indicator frame 10 by the set screw 17. Slidably mounted in the bore 15 is a plunger actuating rod 18 serving as an extension of the dial mechanism operating plunger 13 and of the required length for the shank 14, the lower end extending into the housing 16 and a counterbore 19 in the shank 14.

The entire locating and measuring mechanism consists of a single unit in the form of a head 20 which is formed with a centering flange 21 for mounting it within the housing 16 by the screw 22 extending therethrough and threaded into said housing 16.

This head or unit 20 is formed with a recess 23 and a pair of aligned bores 24 and 25 on its diametrical center line and at right angles to said recess.

Extending upward from the inner face of the head 20, is a boss 26 formed with a vertical slot 27 communicating with the bore 25 and the recess 23, and swingably mounted therein on a transverse pin 28 is a bell-crank lever 29 formed with two rounded contact ends 30 and 31, the end 30 being held in contact with the lower end of the rod 18 due to the normal downward pressure exerted upon said rod 18 by the plunger 13 and the usual spring operated mechanism of the dial indicator.

Slidably mounted in the bore 25 is the contact measuring plunger 32, the inner end of which is slotted as at 42 to embrace and contact with the end 31 of the bell-crank 29 which prevents its rotation and by its inward movement, actuates the bell-crank lever 29 against the spring tension of the plunger 13 and rod 18 to operate the hand 33 of the dial indicator 11. Said plunger 32 being provided with a rounded contact end 34 which may be provided with a diamond point if desired, and the body portion is formed with a cut out 35 for the reception of the end of the lock screw 36 threaded in the head 20 and for the purpose of limiting the outward movement of said contact plunger 32 and also to prevent it from rotating within the bore 25.

Within the inner end of the bore 24 is slidably mounted a plug 37 which is formed with the contact anvil conical head 38 extending into the recess 23; while to exert a normal inward pressure upon said plug 37, the body of the bore 24 is threaded for an adjusting screw 40, cupped on the end for a compression spring 41, the body of which is mounted within the bore 39 of the anvil plug 37, the amount of tension on the plug being regulated by the position of the screw 40 in the threaded bore 24.

In the outer threaded portion of the bore 24 is adjustably threaded a combined locating and measuring pin 44 which is locked in place by a jam-nut 45 threaded thereon in contact with the side of the head 20.

For locating the instrument within the bore 46 of the work, and to allow of the free movement of the contact measuring plunger 32 in cooperating with the pin 44 to determine the diameter of the bore on its true diametrical center line, we have provided the two locating studs 47 which are normally held in an extended position under spring tension and which are in no manner connected together, but which have separate and independent inward movement.

The head 20 is provided with two bores 48 located in the same plane as the bore 25 and equally spaced each side thereof, and in approximately radial relation within the head 20, and within these bores 48 are slidably mounted the locating studs 47 which have the rounded outer work contacting ends 49 and the inner slightly tapered portion 50 which terminates in the rounded end 51, which are retained in normal contact with the conical head 38 by the spiral springs 52 which embrace said tapered portion 50 with one of their ends abutting the wall of the recess 23 adjacent the bore 48, while the other end is retained in a transverse hole 53 in the tapered portion 50 adjacent to the end 51 of the pin 47 in such a manner that the studs are normally urged inwardly or in opposed relation to the spring 41 in such a manner that if either one of the pins 47 is forced inwardly, as in the act of entering the instrument in the bore of the work, the studs 47 will force the anvil plug 37 inward against the action of the spring 41 as urged by its spring 52, while at the same time the other stud 47 will move inward in unison, due to the expansion action of its spring 52, yet the pins 47 are not in any manner secured together.

Due to the shape of the conical head 38 of the plug 37 the axis of said pins 47 is always at right angles to the face of the anvil head 38, sliding thereon as indicated in Figure 4, where they are shown as pressed inward, and in Figure 7, where they are shown in their normal position.

It will therefore be seen that the action of the spring 41 opposes the action of the springs 52 thus retaining the rounded ends 51 of the studs in contact with the head of the anvil 38 at all times, the tension or pressure of the spring 41 can readily be adjusted by the screw 40 and its pressure being greater than that of the springs 52, the pins 47 will be normally retained in their extended position as shown in Figure 7, and their outward movement is limited by the spring 41 the ends of which are attached to the pins 47 by the holes 53.

In the operation of the device, the distance between the faces or ends of the pin 44 and the contact plunger 32 is set by rotating the pin 44 and locking it by the nut 45 to the desired position of the hand 33 of the indicator 11 by the use of a master ring or the like.

The instrument head 20 is then inserted into the bore 46 of the work to be measured and rotated or rocked therein upon the pin 44 and locating studs 47 to first locate the instrument before a reading of the dial indicator is given by the pin 44 and contact plunger 32 showing the diametrical measurement of the bore, and by rotating the instrument within the bore, out-of-roundness is indicated, and by reciprocating the instrument within the bore, taper will be indicated.

The inward movement of the contact plunger rocks the bell-crank and transmits the movement of said plunger to the rod 18 and actuating plunger 13 of the dial mechanism.

Having thus described our invention, what we claim as new and desire to secure by Letters Patent, is:

1. In a bore measuring device, and in combination with an indicator frame having a dial indicator mechanism operating plunger, of a tubular shank member adapted to be secured to said indicator frame, a cupped end formed therein, a unit locating and measuring head mounted in the cupped end of said shank member, adjustable means comprising a threaded pin carried by said head for locating it within and measuring the diametrical bore of the work, a contact measuring plunger aligned therewith, means for transmitting the movement thereof to the dial indicator mechanism operating plunger, comprising a bell-crank and plunger, and means located in said head on a plane with and coacting with the adjustable locating means for locating said head within the bore, said locating means being located in radial relation to said head and upon either side of the measuring means.

2. In a bore gage of the class described, the combination of a head, a locating pin adjustably mounted in said head, a contact meauring plunger slidably mounted in said head in axial alignment with the locating pin, a dial operating bell-crank lever pivoted in said head in contact with said measuring plunger and adapted to transmit movement from said contact plunger to the dial operating bell-crank lever and plunger, two locating studs slidably mounted in said head on a plane with the locating pin and the contact plunger and in approximate radial relation with said head and capable of simultaneous movement with each other, means for normally retaining said studs in an extended position comprising a spring actuated anvil plug, and means for causing either of them to move independently of the other.

3. In a bore gage, the combination with a dial indicator frame having a dial indicator and an operating plunger, of a unit locating and measuring head adapted to be detachably and interchangeably secured to said frame, diametrically aligned adjustable locating and contact measuring means mounted in said head, means for transferring movement from the contact measuring means to the dial indicating operating mechanism comprising a bell-crank and plunger, and a pair of locating studs reciprocally mounted in said head in approximate radial relation therewith, one upon each side of the contact measuring means and in the same plane therewith.

4. In a bore gage of the class described, the combination with a frame having a dial indicator and an operating plunger, of a unit head interchangeable therein, means for axially locating said head within the bore of the work comprising a pin adjustably mounted in said head, a pair of locating studs slidably mounted in said head in independent relation with each other, means located in said head for normally retaining said studs in an outward extended position, means mounted within said head for urging each stud independently inward in direct opposition to the outwardly extending means, and means coacting with the adjustable pin for measuring the bore of the work on its diametrical center line and transmitting said measurement to be indicated by the dial.

5. In a bore gage of the class described, the combination with an indicator frame having a plunger operated mechanism, of a tubular body member detachably secured thereto, a unit self contained head mounted within said tubular body member, a boss formed on the inner face of said head and provided with a slot, a bell-crank lever pivoted in said slot and in contact with the dial plunger, a transverse diametrical bore formed in said head, a recess formed in said head at right angles to said bore and intersecting the same, a locating pin adjustably mounted in one end of said bore, a contact measuring plunger slidably mounted in the opposite end of said bore and in contact with the bell-crank lever, means for limiting both the rotary and reciprocating movement of the contact measuring plunger within the bore, and means mounted within said head for axially locating it within the bore of the work to be measured.

6. In a bore gage of the class described, the combination with an indicator frame having an indicator operating plunger, of a tubular body member detachably secured to said indicator frame and formed with a cup-shaped end, of a self contained unit head mounted within said cup-shaped end, said head having a transverse diametrical bore, a recess formed in said head at right angles to and intersecting the diametrical bore, a pair of radially disposed bores formed in said head upon the same plane as and to each side of the diametrical bore and communicating with said recess, a pair of locating studs slidably mounted within said radial bores with their outer ends projecting from the head, tapered ends formed on said studs extending within said recess and terminating in rounded ends having a transverse hole, coil compression springs mounted on said tapered ends with one end abutting the outer wall of said radial bore and the other end secured within the transverse hole to recede said studs within the head, a plug slidably mounted within said diametrical bore, an anvil head formed on said plug forming a right angle contact with the axis of the studs, a compression spring contained within said plug and diametrical bore and means for adjusting the tension thereof, and combined locating and measuring means mounted in said head on the same plane as the locating means.

7. In a device for gaging internal diameters, comprising a circular head, an aligning pin adjustably mounted in the periphery of said head, a contact measuring plunger slidably mounted in said head in opposed diametrical relation to said pin, means for limiting the movement of said plunger comprising a stop pin, a pair of locating studs slidably mounted in said head in radial relation therewith and located one upon each side of said plunger and in the same plane therewith, means for normally retaining both of said studs in an extended relation with the head comprising a spring actuated anvil plug, and means for exerting inward pressure upon each of said studs in an independent manner comprising springs mounted thereon.

ERIK H. ALDEBORGH.
CHRISTIAN E. RUF.